(12) United States Patent
Choi (10) Patent No.: US 8,997,237 B2
(45) Date of Patent: Mar. 31, 2015

(54) DISPLAY APPARATUS AND THE USING RESTRICTION METHOD THEREOF

(75) Inventor: Jea Hoon Choi, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 628 days.

(21) Appl. No.: 12/742,697

(22) PCT Filed: Nov. 3, 2008

(86) PCT No.: PCT/KR2008/006476
§ 371 (c)(1),
(2), (4) Date: Nov. 18, 2010

(87) PCT Pub. No.: WO2009/064087
PCT Pub. Date: May 22, 2009

(65) Prior Publication Data
US 2011/0051001 A1 Mar. 3, 2011

(30) Foreign Application Priority Data
Nov. 14, 2007 (KR) .................. 10-2007-0115803

(51) Int. Cl.
G06F 7/04 (2006.01)
H04N 5/44 (2011.01)
H04N 21/41 (2011.01)
(Continued)

(52) U.S. Cl.
CPC ............. *H04N 5/44* (2013.01); *H04N 21/4108* (2013.01); *H04N 21/43635* (2013.01); *H04N 21/4753* (2013.01); *H04N 21/485* (2013.01); *H04N 21/436* (2013.01)
USPC .......................................................... 726/26

(58) Field of Classification Search
USPC .................................................. 726/26–30
See application file for complete search history.

(56) References Cited

U.S. PATENT DOCUMENTS

| 6,336,038 B1 * | 1/2002 | Nojima et al. ................ 455/557 |
| 2003/0056209 A1 | 3/2003 | Buck et al. ..................... 725/25 |
| 2004/0143847 A1 | 7/2004 | Suzuki et al. |

(Continued)

FOREIGN PATENT DOCUMENTS

| JP | 2006-129256 | 5/2006 |
| KR | 10-0765797 | 10/2007 |
| WO | WO 03/103223 | 12/2003 |

OTHER PUBLICATIONS

International Search Report issued in PCT/KR2008/006476 dated Mar. 23, 2009.

(Continued)

*Primary Examiner* — Anthony Brown
(74) *Attorney, Agent, or Firm* — KED & Associates LLP (57) ABSTRACT

Provided are a display apparatus and a use restriction method thereof. The display apparatus includes a media interface unit, a memory unit, and a control unit. The media interface unit detects the connection of an external device and receives unique information of the connected external device. The memory unit stores the unique information of the external device received through the media interface unit. The control unit stores/registers the unique information of the connected external device in the memory unit and determines whether to permit the use of the external device connected through the media interface unit on the basis of the unique information registered in the memory unit. Herein, upon detecting the connection of an unregistered external device, the control unit restricts the use of the unregistered external device on the basis of the registered unique information of the external device.

9 Claims, 4 Drawing Sheets

(51) Int. Cl.
*H04N 21/4363* (2011.01)
*H04N 21/475* (2011.01)
*H04N 21/485* (2011.01)
*H04N 21/436* (2011.01)

(56) References Cited

U.S. PATENT DOCUMENTS

2006/0071921 A1* 4/2006 Park et al. .................. 345/204
2006/0212938 A1* 9/2006 Suzuki ........................ 726/16
2006/0287080 A1 12/2006 Bychkov ..................... 463/29
2007/0057931 A1 3/2007 Takamori .................... 345/204
2007/0245398 A1 10/2007 Roden ......................... 725/133

OTHER PUBLICATIONS

European Search Report dated Apr. 25, 2012 issued in Application No. 08 84 9172.

* cited by examiner

| Address | Device |
|---|---|
| 0 | TV |
| 1 | Recording Device 1 |
| 2 | Recording Device 2 |
| 3 | STB1 |
| 4 | DVD1 |
| 5 | Audio System |
| 6 | STB2 |
| 7 | STB3 |
| 8 | DVD2 |
| 9 | Recording Device 3 |
| 10 | Reserved |
| 11 | Reserved |
| 12 | Reserved |
| 13 | Reserved |
| 14 | Free Use |
| 15 | Unregistered (as initiator address) Broadcast (as destination address) |

DISPLAY APPARATUS AND THE USING RESTRICTION METHOD THEREOF

TECHNICAL FIELD

The present disclosure relates to a function of restricting the use of an external device in a display device.

BACKGROUND ART

Recently, digital systems are being complicated day by day, and the number of High-Definition Multimedia Interface (HDMI) terminals among various external inputs of the digital systems is on the increase.

The HDMI provides an integrated channel of pre-existing RGB, Y, and Cb/Cr channels and audio channels. The HDMI is a technology that combines High-Definition (HD) video signals and multichannel audio signals into a single digital interface with a bandwidth of 5 Gbps or more.

Also, the HDMI includes three independent communication channels of a Transition Minimized Differential Signaling (TMDS) channel, a Display Data Channel (DDC), and a Consumer Electronics Control (CEC) channel, which can be used to transmit/receive A/V data, device information, and control commands.

The CEC is an additional protocol for performing a high-level control function in the HDMI, which can be used in the environments of a low transmission rate and a small-capacity memory.

In conclusion, recent display devices have a HDMI-CEC function for users' convenience and thus can control various external devices such as DVDs and STBs. Accordingly, the users can enjoy desired video contents by connecting various external devices to the external input terminals of the display devices.

However, if no user restriction is set, the external devices connected through the external input terminals can be used by adolescent boys or children without restriction. What is therefore required is a use restriction function that can selectively restrict the indiscreet use of the external devices by adolescent boys or children.

DISCLOSURE OF INVENTION

Technical Problem

Embodiments provide a display device and a use restriction method thereof, which enables a user to set a use restriction function for each of various external devices by using unique information of each of the external devices.

Embodiments also provide a display device and a use restriction method thereof, which makes it possible to set a usable time zone and a usable time for each of external devices, thus making it possible to restrict the use of a specific external device during a specific time zone or after the lapse of a specific time.

Technical Solution

In one embodiment, a display apparatus includes: a media interface unit for detecting the connection of an external device and receiving unique information of the connected external device; a memory unit for storing the unique information of the external device received through the media interface unit; and a control unit for storing/registering the unique information of the connected external device in the memory unit and determining whether to permit the use of the external device connected through the media interface unit on the basis of the unique information registered in the memory unit, wherein upon detecting the connection of an unregistered external device, the control unit restricts the use of the unregistered external device on the basis of the registered unique information of the external device.

In another embodiment, a display apparatus includes: a memory unit for storing unique information of registered external devices and use restriction information for each of the registered external devices; a media interface unit for detecting the connection of an external device and receiving unique information of the connected external device; and a control unit for determining whether to permit the use of the external device connected through the media interface unit on the basis of the use restriction information for each of the registered external devices stored in the memory unit.

In further another embodiment, a method for restricting the use of a display apparatus includes: detecting the connection of an external device; receiving unique information of the connected external device; comparing the received unique information of the external device with prestored external device registration information to determine whether the connected external device is registered; and permitting or restricting the use of the external device on the basis of whether the connected external device is registered.

In still further another embodiment, a method for restricting the use of a display apparatus includes: upon detection of the connection of an external device, determining whether unique information of the connected external device is registered; if the external device is a registered external device, detecting use restriction information corresponding to the unique information of the connected external device; and permitting or restricting the use of the connected external device on the basis of the detected use restriction information.

The details of one or more embodiments are set forth in the accompanying drawings and the description below. Other features will be apparent from the description and drawings, and from the claims.

Advantageous Effects

The present invention provides a user restriction function of setting a use restriction on each external device to restrict the use of an unregistered external device, thereby making it possible to prevent the indiscreet use of external devices by adolescent boys or children.

Also, the present invention determines the usability of each external device on the basis of information about a usable time and a usable time zone of each external device, thereby making it possible to prevent the long-time use of even a use-permitted external device by adolescent boys or children.

Also, the present invention provides additional information including product information and usability information of a currently-connected external device, thereby making it possible to prevent a user from misunderstanding a use-restricted product as being out of order.

BEST MODE FOR CARRYING OUT THE INVENTION

Reference will now be made in detail to the embodiments of the present disclosure, examples of which are illustrated in the accompanying drawings.

Figure 1:
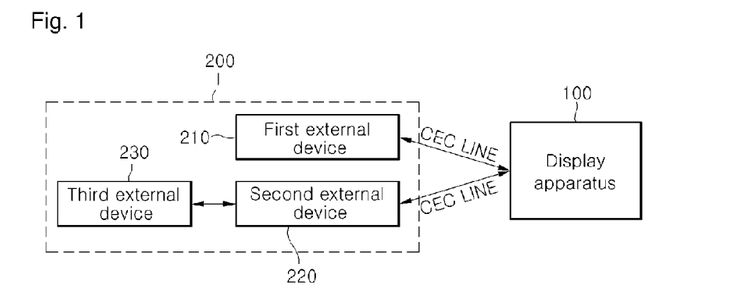
FIG. 1 is a block diagram of a display system according to an exemplary embodiment.

FIG. 1 is a block diagram of a display system according to an exemplary embodiment.

Referring to FIG. 1, the display system includes: an external apparatus 200 for providing a video signal; and a display apparatus 100 for receiving/displaying the video signal provided from the external apparatus 200.

The display apparatus 100 supports a Digital Visual Interface (DVI) or a High-Definition Multimedia Interface (HDMI). The display apparatus 100 is connected to the external apparatus 200 to receive/output video signals and/or audio signals provided through the external apparatus 200.

Also, a typical example of the display apparatus 100 is a broadcast receiver that receives a Radio Frequency (RF) broadcast signal, to which the present invention is not limited. The present invention may be applied to terrestrial, cable, satellite, Internet or computer network broadcast systems. Examples of such systems include non-MPEG compatible systems that transmit different types of encoded data streams and program specific information.

The external apparatus 200 may include a first external device 210, a second external device 220, and a third external device 230 that are different in type. That is, examples of the external apparatus 200 include DVD players, DVD recorders, games, settop boxes (STB), and personal computers (PCs).

The external apparatus 200 is connected through a DVI or HDMI interface to the display apparatus 100 to provide various data to the display apparatus 100.

Also, as illustrated in FIG. 1, the external devices of the external apparatus 200 may be respectively connected to HDMI ports, or may be commonly connected to one HDMI port. If the external devices are commonly connected to the HDMI port, one of the connected external devices may be selected by switch operation control.

Hereinafter, a detailed description will be given of a configuration of the display apparatus 100.

Figure 2:
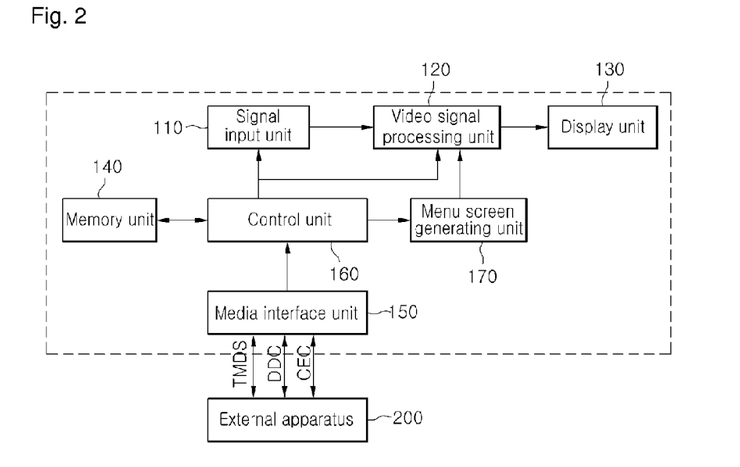
FIG. 2 is a block diagram of a display apparatus according to an exemplary embodiment.

Referring to FIG. 2, the display apparatus 100 is a receiver for receiving a broadcast signal input from the outside. The display apparatus 100 includes: a signal input unit 110 for receiving/processing a broadcast signal of a desired channel of a user; a video signal processing unit 120 for processing a video signal input through the signal input unit 110 into a displayable signal; a display unit 130 for displaying a displayable video signal processed through the video signal processing unit 120; a memory unit 140 for storing unique information of registered external devices and use restriction information about the unique information; a media interface unit 150 for connecting an external device and receiving unique information of the connected external device; a control unit 160 for restricting the use of the connected external device on the basis of the unique information of the connected external device provided from the media interface unit 150; and a menu screen generating unit 170 for generating an On-Screen Display (OSD)-type password input screen for use permission of a use-restricted external device or for registration/use permission of an unregistered external device.

A detailed description will be given of a process for determining whether to permit the use of a connected external device, on the basis of unique information of the connected external device.

The signal input unit 110 receives an external broadcast signal through an antenna (not illustrated). The signal input unit 110 includes: a tuner for tuning a broadcast signal with a frequency band according to a tuning control signal of the control unit 160; and a demodulator for performing a Vestigial Sideband (VSB) demodulation process and an error correction process on the tuned broadcast signal to output the same in the form of a transport stream (TS); and a demultiplexer for dividing the TS broadcast signal into a video signal, an audio signal, and various additional data defined by Program and System Information Protocol (PSIP) information, to output the same in the form of a bit stream.

Video data, divided through the signal input unit 110, are processed by the video signal processing unit 120, and the results are displayed on the display unit 130.

Herein, the video signal processing unit 120 includes: an MPEG-2 decoder; and a scaler for converting video data in accordance with a screen ratio, a resolution, and a vertical frequency according to the display format of the display unit 130.

Herein, the display unit 130 may be applied to various types of display modules such as Digital Light Processing (DLP) modules, Liquid Crystal Display (LCD) modules, and Plasma Display Panel (PDP) modules.

The memory unit 140 stores various data and may be an Electrically Erasable and Programmable Read Only Memory (EEPROM).

The media interface unit 150 is an interface to which an external device is actually connected. The media interface unit 150 may include a DVI and a HDMI. Although a HDMI is exemplified in an exemplary embodiment for convenience in description, the present invention is not limited thereto. However, it is preferable that the media interface unit 150 is a HDMI.

That is, the display apparatus supporting the HDMI and the DVI may transmit/receive A/V data, device information, and control commands through three independent communication channels of a Transition Minimized Differential Signaling (TMDS) channel, a Display Data Channel (DDC), and a Consumer Electronics Control (CEC) channel. Herein, A/V data are transmitted/received through the TMDS channel, and Extended Display Identification Data (EDID) data are transmitted/received through the DDC.

Specifically, the CED is an additional protocol that performs a high-level control function in the HDMI, which can be used in the environments of a low transmission rate and a small-capacity memory.

On the basis of unique information of an external device connected through the media interface unit 150, the control unit 160 determines whether to permit the use of the connected external device.

The menu screen generating unit 170 generates/outputs information about the usability of the external device determined through the control unit 160, a password input window for use permission of a use-restricted external device, and a registration screen for registration of an unregistered external device, in the form of an OSD.

Hereinafter, a detailed description will be given of an operation of the control unit 160.

Upon detecting the connection of an external device through the media interface unit 150, the control unit 160 detects unique information of the connected external device and determines whether to permit the use of the connected external device on the basis of the detected unique information.

Herein, the unique information may be one of a product ID, a vendor ID, and a logical address.

The product ID and the vendor ID are unique identification numbers that is assigned by a USB or IEEE1394 standard management organization to a manufacturer of each external device. Thus, each external device can be identified through a product ID and a vendor ID.

Figure 3:
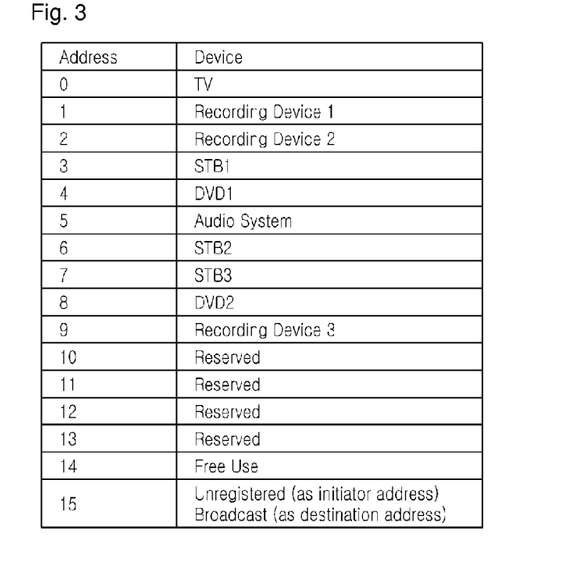
FIG. 3 is a table illustrating an example of unique information of external devices according to an exemplary embodiment.

Also, referring to FIG. 3, the logical address is information assigned according to the type of the connected external device. A unique logical address is assigned to each external device by the control unit 160 at the connection thereof. Also, the assigned logical address may be deleted or changed later by the user.

In other words, the logical address may be assigned to each external device, and the assigned logical address may be used to automatically determine the feature and type of an external device to be connected later.

Accordingly, upon detecting the connection of an external device through the media interface unit 150, the control unit 160 determines whether the connected external device is registered, on the basis of unique information of the detected external device.

That is, upon detecting the connection of an external device, the control unit 160 receives unique information of the connected external device and stores the received unique information in the memory unit 140, thereby registering the connected external device.

Figure 4:
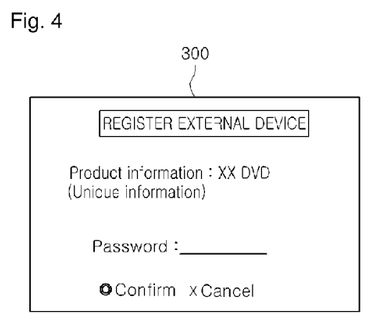
FIG. 4 is a diagram illustrating an example of an external device registration screen according to an exemplary embodiment.

Herein, referring to FIG. 4, a separate external device registration screen is displayed to register the external device, and whether to register the connected external device is determined according to whether a password is normally input on the displayed registration screen.

In other words, if the password input on the registration screen is identical to a preset password, the control unit 160 stores unique information of the connected external device to register the connected external device; and if the input password is not identical to the preset password, the control unit 160 does not register the connected external device.

In an exemplary embodiment, whether to permit the use of the connected external device is determined according to whether the connected external device is registered.

That is, upon detecting the connection of an external device through the media interface unit 150, the control unit 160 compares unique information of the connected external device with unique information of the external device pre-stored in the memory unit 140.

If the unique information of the connected external device is present among the unique information of the registered external devices, the control unit 160 permits the use of the connected external device.

Also, if the unique information of the connected external device is not present among the unique information of the registered external devices, the control unit 160 does not permit the use of the connected external device to restrict the use of the connected external device.

Herein, if the use of the connected external device is restricted due to the unregistration thereof, the registration screen illustrated in FIG. 4 is provided to perform a registration process of the connected external device.

That is, according to whether the password is normally input on the registration screen, the control unit 160 stores unique information of the unregistered external device in the memory unit 140 to register the unregistered external device, thereby permitting the use of the external device.

In other words, in an exemplary embodiment, whether to permit the use of the connected external device is determined only by whether the connected external device is registered or not.

Hereinafter, a detailed description will be given of another exemplary embodiment.

In another exemplary embodiment, unique information of registered external devices and use restriction information for each unique information are stored in the memory unit 140.

Herein, the use restriction information may be the usability or unusability information for each unique information and/or the usable time information for each unique information.

Herein, the usable time information includes information about a usable time zone and information about a designated usable time.

For example, the usable time zone information denotes usable time zone information of an external device, such as '18:00~20:00', and the designated usable time information denotes usable time information of the external device, such as 'three hours'.

In other words, if the usable time zone information is set to '18:00~20:00', the use of the external device is permitted only during the set time zone; and if the usable time information is set to 'three hours', the use of the external device is permitted only for three hours from the connection of the external device.

Accordingly, upon detecting the connection of an external device, the control unit 160 determines whether the connected external device is registered, on the basis of unique information of the connected external device.

Herein, if the connected external device is a registered external device, the control unit 160 extracts the use restriction information of the external device from the memory unit 140.

Also, if the connected external device is an unregistered external device, the control unit 160 performs a separate registration process as in the above exemplary embodiment to determine whether to permit the use of the external device.

The control unit 160 determines whether to permit the use of the connected external device on the basis of the use restriction information extracted from the memory unit 140.

That is, the control unit 160 permits the use of the connected external device, if the usability information of the connected external device is present in the use restriction information, or if the current time is within a usable time of the external device as a result of comparison of the current time with the time information of the external device present in the use restriction information.

Figure 5:
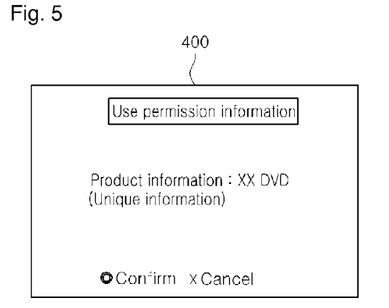
FIG. 5 is a diagram illustrating an example of a use permission information screen according to an exemplary embodiment.

Then, the control unit 160 controls the display of use permission information of the use-permitted external device. That is, referring to FIG. 5, use permission information 400 of the use-permitted external device is displayed so that the user can easily detect information of the currently-used external device.

Also, the control unit 160 restricts the use of the connected external device, if the use of the connected external device is restricted in the use restriction information, or if the current time is within an unusable time of the external device.

Herein, if the use of the external device is restricted, because video data provided from the external device are not displayed through the display apparatus, the user may misunderstand that the display apparatus is out of order.

Thus, the control unit 160 controls the display of the use restriction information of the use-restricted external device. That is, referring to FIG. 6, use restriction information 500 of the use-restricted external device is displayed so that the user can easily detect that a currently-connected external device is a use-restricted external device.

Figure 6:
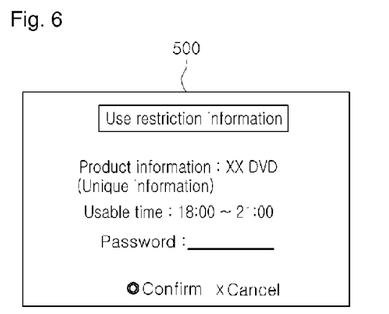
FIG. 6 is a diagram illustrating an example of use restriction information according to an exemplary embodiment.

Also, in addition to the unique information of the external device, the usable time information of the external device is displayed in the use restriction information 500 so that the user can easily detect in which condition the external device can be used. Also, a password input window is provided for use of the use-restricted external device, thus making it possible to use the use-restricted external device.

Meanwhile, there is a case where the use of the external device is restricted due to the unregistration thereof, in addition to a case where the use of the external device is restricted due to the unusability of the external device although the external device is already registered.

Figure 7:
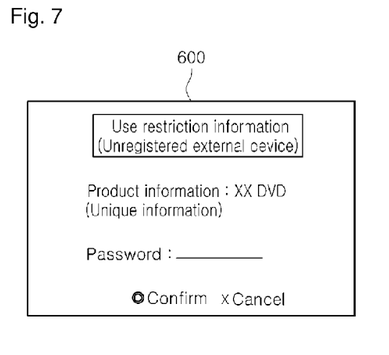
FIG. 7 is a diagram illustrating another example of use restriction information according to an exemplary embodiment.

Thus, the control unit 160 displays the use restriction information indicating that the use of the external device is restricted due to the unregistration thereof. That is, referring to FIG. 7, like the use restriction information 60, the use restriction information 500 due to the unregistration includes a separate message indicating that the external device is an unregistered external device.

Also, even in the case of a use-restricted external device, the control unit 160 periodically checks the use restriction information of the external device to restrict the use of the external device that is currently used by the user.

That is, the control unit 160 restricts the use of the external device, if the currently-used external device deviates from the preset usable time zone, or if the external device is used longer than the preset usable time.

For example, if the current time is 20 o'clock and the usable time zone of the external device was set to '18:00~20:00', the use of the external device is permitted only till 20 o'clock and is restricted after 20 o'clock.

Also, if a usable time of the external device currently used by the user was set to 'three hours' and the detection time of the connection of the external device is '16:00', the use of the external device is permitted only till '19:00' and is restricted after '19:00'.

Herein, if the external device is reconnected after release of the connection thereof, because the external device can be used for another three hours, a separate use restriction condition, such as 'three hours per day' or 'restricted for ten hours after used for three hours', may be set.

As described above, the display apparatus according to the exemplary embodiment provides a function of setting the use restriction for each external device and restricting the use of external devices other than use-permitted external devices, thereby making it possible to prevent the indiscreet use of the external devices by adolescent boys or children.

Also, the display apparatus determines the usability of each external device on the basis of the usable time information or the usable time zone information of the external device, thereby making it possible to prevent the long-time use of even the use-permitted external device by adolescent boys and children.

Also, the display device provides the additional information including the product information and the usability information of the currently-connected external device, thereby making it possible to prevent the case of misunderstanding that the use-restricted product is out of order.

Hereinafter, a use restriction method of the display apparatus according to an exemplary embodiment will be described in detail with reference to FIG. 8.

Figure 8:
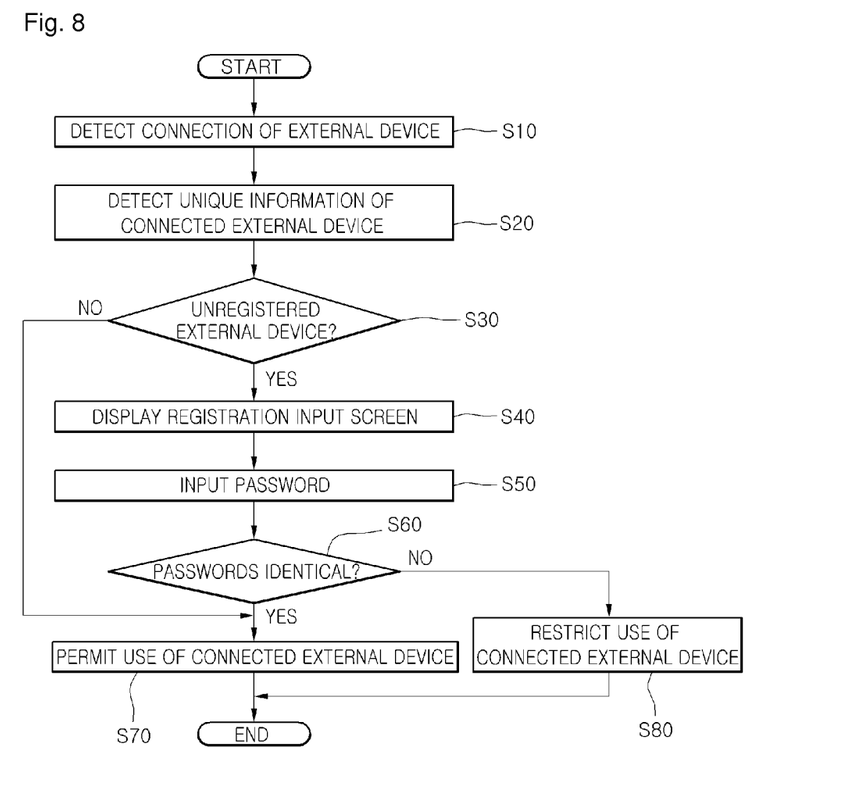
FIG. 8 is a flow diagram illustrating a use restriction method of a display apparatus according to an exemplary embodiment.

Referring to FIG. 8, the connection of an external device is first detected (S10). That is, it is determined whether a cable for connection of the external device is inserted into the media interface unit 140.

Thereafter, the unique information of the connected external device is detected (S20). That is, one of the vendor ID, the product ID and the logical address of the connected external device is detected.

Then, it is determined whether the detected unique information of the external device is registered information or unregistered information (S30). That is, it is determined that the unique information of the connected external device is present among the unique information of the already-registered external devices.

Thereafter, if the connected external device is an unregistered external device as a result of the determination (S30), a registration input screen for registration of the external device is displayed (S40).

Then, a password is input on the displayed registration input screen by the user (S50).

Thereafter, it is determined whether the password is normally input (S60). That is, it is determined whether the input password is identical to a preset password.

Then, if the connected external device is an already-registered external device as a result of the determination (S30), or if the password is normally input as a result of the determination (S60), the use of the connected external device is permitted (S70).

Also, if the password is not normally input as a result of the determination (S60), the use of the connected external device is restricted (S80).

Hereinafter, a use restriction method of the display apparatus according to another exemplary embodiment will be described in detail with reference to FIG. 9.

Figure 9:
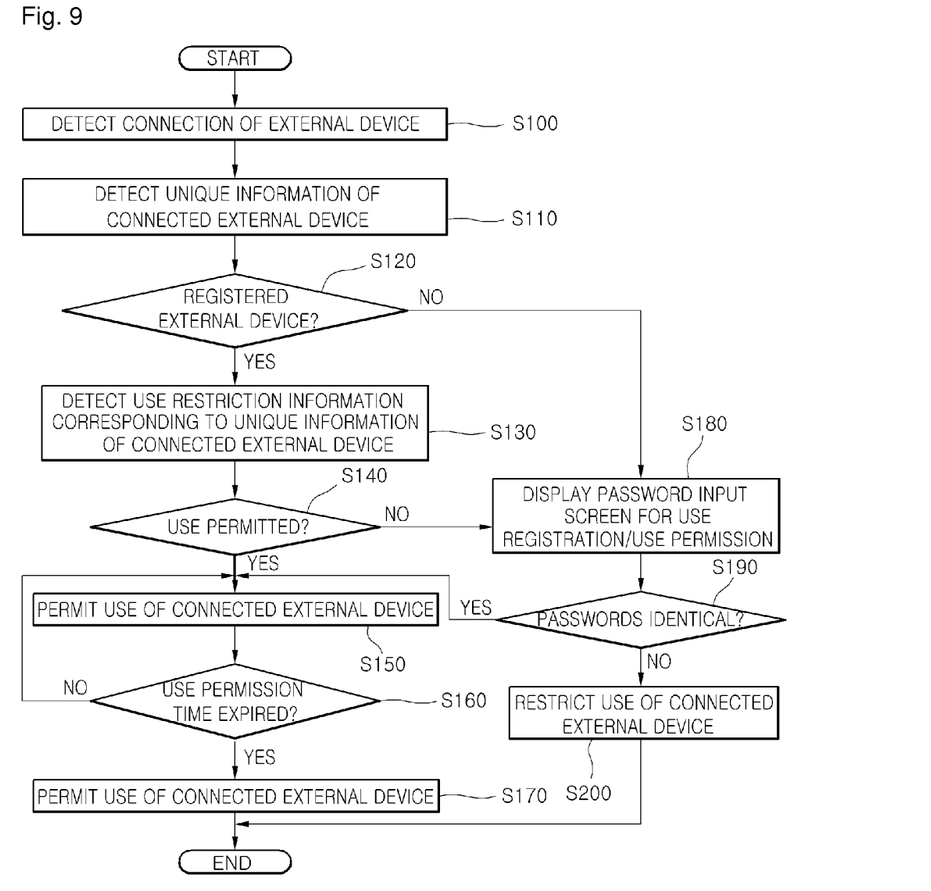
FIG. 9 is a flow diagram illustrating a use restriction method of a display apparatus according to another exemplary embodiment.

Referring to FIG. 9, the connection of an external device is first detected (S100). That is, it is determined whether a cable for connection of the external device is inserted into the media interface unit 140.

Thereafter, the unique information of the connected external device is detected (S110). That is, one of the vendor ID, the product ID and the logical address of the connected external device is detected.

Then, it is determined whether the detected unique information of the external device is already-registered information or unregistered information (S120). That is, it is determined that the unique information of the connected external device is present among the unique information of the already-registered external devices.

Thereafter, if the connected external device is an already-registered device as a result of the determination (S120), use restriction information corresponding to the unique information of the external device is detected (S130).

Then, whether to permit the use of the connected external device is determined on the basis of the detected use restriction information (S140).

Thereafter, if the use of the external device is permitted as a result of the determination (S140), the use of the connected external device is permitted (S150).

Then, it is determined whether a use permission time of the use-permitted external device expires (S160).

Thereafter, if the use permission time of the use-permitted external device expires as a result of the determination (S160), the use of the external device currently used by the user is restricted (S170).

Meanwhile, if the connected external device is an unregistered external device as a result of the determination (S120), or if the use of the connected external device is restricted as a result of the determination (S140), a password input screen for registration/use permission of the external device is displayed (S180).

Thereafter, it is determined whether a password is normally input on the password input screen (S190). That is, it is determined whether the input password is identical to a preset password.

Then, if the password is normally input as a result of the determination (S190), the method proceeds to step S150 to permit the use of the connected external device.

Also, if the password is not normally input as a result of the determination (S190), the use of the connected external device is restricted (S200).

As described above, the use restriction method of the display apparatus according to the exemplary embodiments provides a user restriction function of setting a use restriction on each external device to restrict the use of an unregistered external device, thereby making it possible to prevent the indiscreet use of external devices by adolescent boys or children.

Also, the use restriction method determines the usability of each external device on the basis of information about a usable time and a usable time zone of each external device, thereby making it possible to prevent the long-time use of even a use-permitted external device by adolescent boys or children.

Also, the use restriction method provides additional information including product information and usability information of a currently-connected external device, thereby making it possible to prevent a user from misunderstanding a use-restricted product as being out of order.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The present invention can be applied to display apparatuses to which external devices can be connected.

The invention claimed is:

1. A display apparatus comprising:
a display unit;
a memory unit configured to store unique information of registered external devices and restriction information on use for each of the registered external devices;
a media interface unit configured to detect a connection of an external device and receive unique information from the connected external device; and
a control unit configured to:
determine whether to permit a use of the connected external device based on the restriction information corresponding to the unique information when the connected external device is a pre-registered device,
allow the connected external device to operate when the use of the connected external device is permitted based on the restriction information,
display restriction information when the use of the connected external device is not permitted based on the restriction information, wherein the restriction information includes usable time that the connected external device can be used in a predetermined time or in a predetermined time period, and
display a menu for registering the connected external device when the connected external device is not a pre-registered device.

2. The display apparatus according to claim 1, wherein the unique information of the external device is one of vendor ID information, product ID information, and logical address information.

3. The display apparatus according to claim 1, wherein the control unit restricts the use of the external device in an undesignated time based on the usable time information for each external device.

4. The display apparatus according to claim 1, wherein the media interface unit is a High-Definition Multimedia Interface (HDMI).

5. A method for restricting use of a display apparatus, comprising:
upon detection of connection of an external device, determining whether unique information of the connected external device is registered;
determining whether to permit a use of the connected external device based on restriction information corresponding to the unique information when the connected external device is a pre-registered device,
allowing the connected external device to operate when the use of the connected external device is permitted based on the restriction information,
displaying restriction information when the use of the connected external device is not permitted based on the restriction information, wherein the restriction information includes usable time that the connected external device can be used in a predetermined time or in a predetermined time period, and
displaying a menu for registering the connected external device when the connected external device is not a pre-registered device.

6. The method according to claim 5, further comprising setting the usable time or usability information corresponding to unique information of a registered external device.

7. The method according to claim 5, further comprising displaying a password input screen for registration/use permission of an unregistered external device or for use permission of a use restricted external device,
wherein the use of the unregistered external device or the use restricted external device is permitted based on a password input on the password input screen.

8. The method according to claim 5, further comprising:
periodically detecting whether a usable time expires, based on usable time information of a use permitted external device; and
restricting the use of a currently used external device according to whether the usable time expires.

9. The method according to claim 5, wherein the unique information of the external device is one of vendor ID information, product ID information, and logical address information.

* * * * *